US012690001B2

(12) United States Patent
     Kang

(10) Patent No.:    US 12,690,001 B2
(45) Date of Patent:        Jul. 21, 2026

(54) CORE NETWORK SYSTEM

(71) Applicant: VIVO MOBILE COMMUNICATION CO., LTD., Dongguan (CN)

(72) Inventor: Yanchao Kang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 323 days.

(21) Appl. No.: 18/229,658

(22) Filed: Aug. 2, 2023

(65) Prior Publication Data

US 2023/0379853 A1      Nov. 23, 2023

Related U.S. Application Data

(63) Continuation of application No. PCT/CN2022/074961, filed on Jan. 29, 2022.

(30) Foreign Application Priority Data

Feb. 3, 2021      (CN) .......................... 202110150354.4

(51) Int. Cl.
     H04W 60/00          (2009.01)
     H04W 8/00            (2009.01)
     H04W 12/06          (2021.01)

(52) U.S. Cl.
     CPC ........... H04W 60/00 (2013.01); H04W 12/06 (2013.01)

(58) Field of Classification Search
     CPC ..... H04W 12/06; H04W 12/08; H04W 60/00; H04W 8/00; H04W 8/065; H04W 8/14; H04W 92/10; H04W 12/086; H04W 76/12; H04W 12/35; H04W 8/18; H04W 16/18; H04W 36/30; H04W 40/24; H04W 40/246; H04W 84/045; H04W 88/16; H04L 45/80; H04L 41/122; H04L 41/0895; H04L 45/76; H04L 12/4633; H04L 12/66; H04L 41/0654; H04L 41/0806; H04L 41/5019; H04L 45/28; H04L 45/64; H04L 45/74; H04L 63/0272
See application file for complete search history.

(56) References Cited

U.S. PATENT DOCUMENTS

| | | | |
|---|---|---|---|
| 12,149,927 B2 * | 11/2024 | Nakarmi | ............... H04W 12/06 |
| 2019/0246370 A1 | 8/2019 | Xu et al. | |
| 2019/0254089 A1 * | 8/2019 | Huang-Fu | ............. H04W 80/10 |

(Continued)

FOREIGN PATENT DOCUMENTS

| | | |
|---|---|---|
| CN | 110366276 A | 10/2019 |
| CN | 110933623 A | 3/2020 |

(Continued)

OTHER PUBLICATIONS

International Search Report issued in corresponding International Application No. PCT/CN2022/074961, mailed May 7, 2022, 6 pages.

(Continued)

*Primary Examiner* — Khawar Iqbal
(74) *Attorney, Agent, or Firm* — IPX PLLC

(57)          ABSTRACT

A core network system is provided. The core network system includes: a terminal and multiple core network functions. The terminal and at least one of the multiple core network functions directly exchange information through a Service-Based Architecture (SBA) interface.

8 Claims, 11 Drawing Sheets

(56)           References Cited

U.S. PATENT DOCUMENTS

| | | | |
|---|---|---|---|
| 2020/0228605 A1* | 7/2020 | Dodd-Noble | H04W 12/08 |
| 2021/0258872 A1* | 8/2021 | Mihály | H04W 60/00 |
| 2022/0224760 A1* | 7/2022 | Foti | H04L 67/51 |
| 2022/0263906 A1* | 8/2022 | Dodd-Noble | H04W 76/12 |
| 2022/0408251 A1* | 12/2022 | Castellanos Zamora | |
| | | | H04W 12/72 |
| 2023/0022607 A1* | 1/2023 | Islam | H04L 5/0091 |
| 2023/0224756 A1* | 7/2023 | Shekhar | H04L 67/563 |
| | | | 370/252 |
| 2023/0379712 A1* | 11/2023 | Kang | H04W 12/72 |
| 2023/0412408 A1* | 12/2023 | Törnkvist | H04L 12/1407 |
| 2023/0413210 A1* | 12/2023 | Lee | H04W 60/00 |
| 2023/0413360 A1* | 12/2023 | Velev | H04W 48/18 |
| 2025/0106243 A1* | 3/2025 | Shaw | H04L 63/1433 |

FOREIGN PATENT DOCUMENTS

| | | |
|---|---|---|
| CN | 111405567 A | 7/2020 |
| WO | 2019238249 A | 12/2019 |

OTHER PUBLICATIONS

Extended European Search Report issued in related European Application No. 22749157.8, mailed May 15, 2024, 9 pages.
First Office Action issued in related Chinese Application No. 202110150354.4, mailed May 17, 2024, 7 pages.

\* cited by examiner

CORE NETWORK SYSTEM

CROSS-REFERENCE OF RELATED APPLICATIONS

The present application is a continuation of International Application No. PCT/CN2022/074961, filed on Jan. 29, 2022, which claims priority to Chinese Patent Application No. 202110150354.4, filed on Feb. 3, 2021. The entire contents of each of the above-referenced applications are expressly incorporated herein by reference.

TECHNICAL FIELD

The present application belongs to the technical field of communication, and specifically relates to a core network system.

BACKGROUND

The only interface between the terminal and the core network entity is the N1 interface between the terminal and the Access and Mobility Management Function (AMF). The communication between the terminal and the AMF is performed based on the Non-Access Stratum (NAS) protocol.

Information (or a message, signaling, or the like) transmitted on the N1 interface includes not only information between the terminal and the AMF, but also information between the terminal and other core network functions, for example, session management messages between the terminal and the Session Management Function (SMF), and short messages between the terminal and a Short Message Service (SMS) function.

In the related technology, information sent by the terminal to other core network functions needs to be encapsulated in a securely protected N1 interface NAS message and sent to the AMF, and then the AMF decrypts the message and then forwards other information encapsulated in the NAS message to the corresponding core network entity. Correspondingly, downlink messages sent to the terminal by other core network functions must also be sent to the AMF first, and then encapsulated in an N1 interface NAS by the AMF, and then sent to the terminal after being subjected to integrity protection and ciphering processing. This results in low efficiency of information transmission between the terminal and core network functions.

SUMMARY

The embodiments of the present application provide a core network system.

In a first aspect, a core network system is provided, including: a terminal and multiple core network functions, where the terminal and at least one of the multiple core network functions directly exchange information through a Service-Based Architecture (SBA) interface.

In the core network system provided by the embodiments of the present application, the terminal and at least one of the multiple core network functions directly exchange information through the SBA interface. Compared with the manner of forwarding information through an AMF, the efficiency of information transmission between the terminal and the core network functions can be improved.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The $6^{th}$ Generation (6G) communication systems are described below for example purposes, and 6G terminologies are used in most of the following descriptions, but these techniques can also be applied to applications other than 6G system applications, such as 5G evolution systems and 7G systems.

The embodiments of this application provide a NAS interface/SBA solution, and introduce a core network system including terminals. The core network system includes a terminal and multiple core network functions, where the terminal and at least one of the multiple core network functions directly exchange information through the SBA interface, or in other words, the terminal and at least one of the multiple core network functions communicate directly through the SBA interface. For example, the terminal and all core network functions in the core network system can communicate directly through the SBA interface.

In the core network system provided by the embodiments of the present application, the terminal and at least one of the multiple core network functions directly exchange information through the SBA interface. Compared with the manner of forwarding information through an AMF, the efficiency of information transmission between the terminal and the core network functions can be improved.

It should be noted that the core network functions mentioned in various embodiments of the present application, such as a network element selection function, are usually functional entities capable of realizing certain functions. Therefore, other technical terms can also be used to replace these core network functions, for example, technical terms such as "network element selection entity" and "core network function selection entity" are used to replace the "network element selection function".

Figure 1:
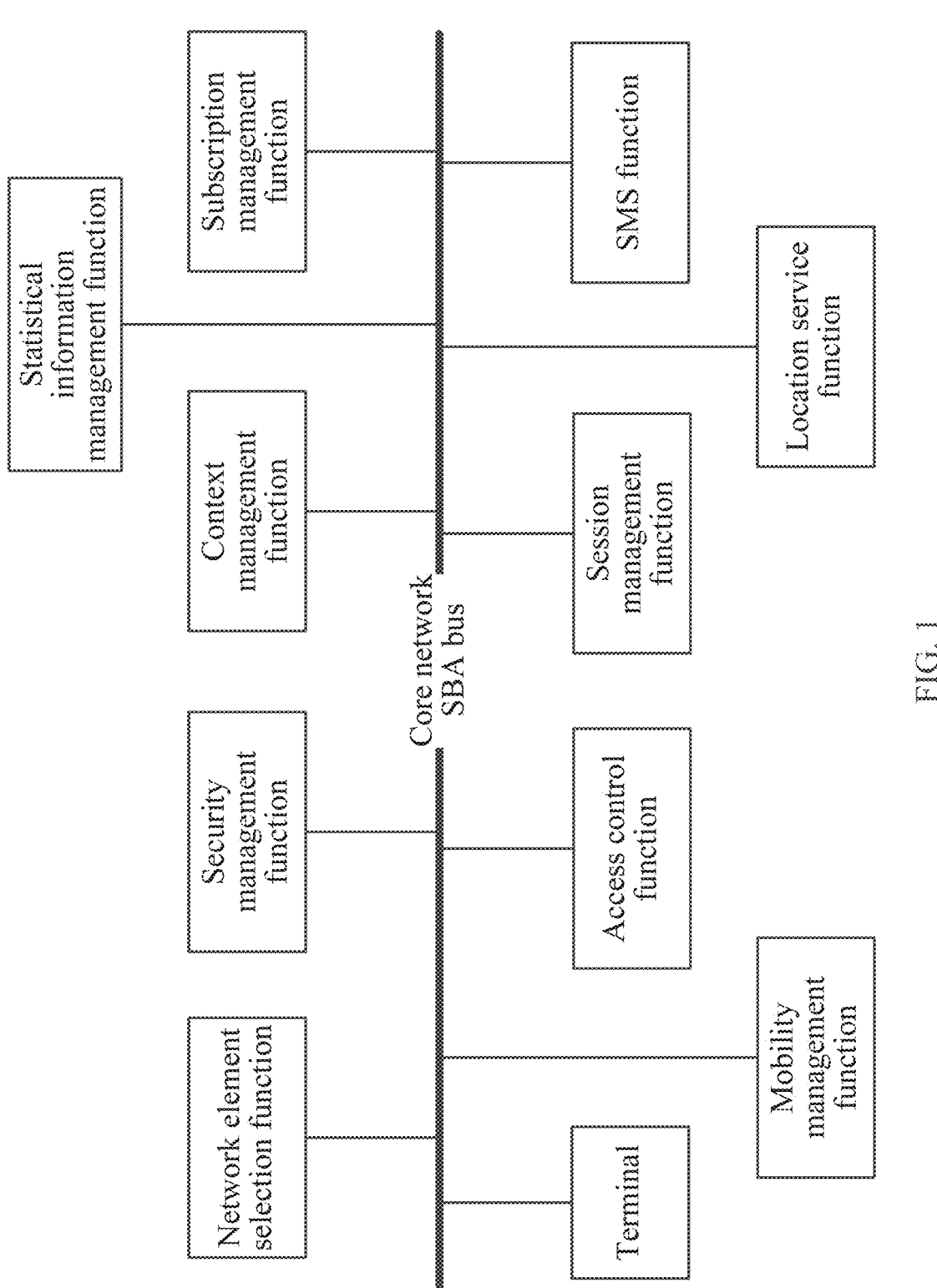
FIG. 1 is a schematic structural diagram of a core network system according to an embodiment of the present application.

FIG. 1 is a schematic structural diagram of a core network system according to an embodiment of the present application. In this embodiment, a terminal and multiple core network functions are connected through a core network SBA bus, the terminal can invoke, through the core network SBA bus, services provided by multiple core network functions, and the multiple core network functions can provide services for the terminal through the core network SBA bus.

In the embodiment shown in FIG. 1, core network functions in the core network system include: a network element selection function, a security management function (or referred to as a NAS security function), a context management function, a statistical information management function, a subscription management function, an access control function, a mobility management function, a session management function, a location service function, and a SMS function.

It should be noted that the core network system shown in FIG. 1 schematically shows multiple core network functions. In some other embodiments, the core network system may include some of the actual core network functions described above. FIG. 1 is only an embodiment, and some of the core network functions may also be replaced by other core network functions. In an example, the multiple core network functions include at least one of the following: a network element selection function, a security management function (or referred to as a NAS security function), a context management function, and a statistical information management function. In an example, the multiple core network functions may further include at least one of the following: an access control function and a mobility management function. In an example, the multiple core network functions include at least one of the following: a subscription management function; a session management function; a location service function; and a short message service function.

The main functions of the core network functions mentioned in the above multiple embodiments will be introduced below.

(1) The security management function (or referred to as a NAS security function) is configured to provide at least one of the following services: initial authentication and secret key generation services, a security mode establishment service, a NAS message ciphering service, and a NAS message decryption service.

In this embodiment, the NAS security function can be separated from the AMF as an independent core network function, and the NAS security function supports the SBA interface. In some embodiments, the NAS security function may further include an Authentication Server Function (AUSF), which is configured to perform authentication of 3GPP access and non-3rd-Generation Partnership Project (non-3GPP) access.

Services (or referred to as functions below) provided by the NAS security function to the terminal include, for example: initial authentication and secret key generation services and security mode establishment services.

Services provided by the NAS security function to other core network functions include, for example a security mode establishment service; a NAS message ciphering service, and a NAS message decryption service.

In some embodiments, the NAS security function may also be configured to provide a terminal context (or referred to as a terminal security context) for a target core network function before the target core network function communicates with the terminal.

(2) The context management function is configured to provide at least one of the following services: a terminal context query service and a terminal context update service.

This embodiment introduces a new context management function and supports the SBA interface.

Services provided by the context management function entity to the terminal include, for example: a terminal context query service and a terminal context update function, for example, the entity provides an identifier of a core network function of a service for the terminal, or provides a context related to a service for the terminal.

Services provided by the context management function to other core network functions include, for example: a terminal context query service and a terminal context update function. For example, the function provides a terminal context for the target core network function, or provides a context related to a service of the terminal. For another example, after the target core network function communicates with the terminal, a new terminal context is generated or an existing context of the terminal is updated, and the target core network function needs to send the latest terminal context to the context management functional entity.

(3) A network element selection function is configured to provide at least one of the following services: selecting a required core network function for the terminal according to terminal requirements, and selecting, for the target network function, a core network function to be enabled.

This embodiment introduces a new network element selection function and supports the SBA interface.

Services provided by the network element selection function to the terminal include, for example, selecting, for the terminal according to terminal requirements, a core network function that requires a communication connection.

Services provided by the network element selection function to other core network functions include, for example: selecting, for a target network function according to requirements of the target network function, a core network function that requires a communication connection. The target network function may be connected to the core network SBA bus in FIG. 1, and the target network function may be a core network function or other network functions, such as an access network function.

In some embodiments, the network element selection function is configured to select, for the terminal according to a type of a service requested by the terminal, a core network function capable of providing the service. For example, if the type of the service requested by the terminal is a short message, the network element selection function may select the SMS function for the terminal, so that a communication connection is established between the terminal and the SMS function.

Usually, before the terminal is successfully registered, the terminal can select an access control function. After the terminal is successfully registered, the terminal can select a core network function of a registered related service. Usually, a mobility management process is a service provided by the network by default. In some embodiments, the session management service can also be a service provided by the network by default.

(4) The statistical information management function is configured to provide services including: statistics collection and/or feedback of target information.

This embodiment introduces a new statistical information management function and supports the SBA interface.

The statistical information management function can perform statistics collection and/or feedback of target information. For example, according to the request of the terminal, the function feeds back, to the terminal, the target information whose statistics has been collected; and according to the request of the target core network function, feeds back, to the target core network function, the target information whose statistics has been collected.

(5) The access control function is configured to provide access services and initial registration services for the terminal.

(6) The mobility management function is configured to provide mobility management services for the terminal.

In an example, the access control function and the mobility management function are functions of the same core network.

In another example, the access control function and the mobility management function are two independent core network functions. A case that the access control function and the mobility management function are independent will be described below.

In some embodiments, the access service and the initial registration service provided by the access control function may include at least one of the following (1) to (8).

(1) A second interface (N2) control plane message is received, and the N2 control plane message is locally processed or first target information in the N2 control plane message is sent to a first target network function. In this example, the access control function serves as a termination point of the N2 control plane protocol (Termination of RAN CP interface). The first target network function mentioned in this example may be a network function, such as a mobility management function other than the access control function in the core network system.

(2) Second target information from a second target network function is received, and an N2 control plane message including the second target information is sent to the access network device. In this example, the access control function serves as a termination point of the N2 control plane protocol (Termination of RAN CP interface (N2)).

(3) The N2 control plane message is sent to the access network device. In this example, the N2 control plane message may be locally generated by the access control function.

(4) Ciphering and integrity protection services for NAS messages. In this example, the access control function serves as a termination point of the NAS protocol (Termination of NAS (N1)), and can perform ciphering and integrity protection on NAS messages.

(5) NAS connection management service. In this embodiment, the termination point of the NAS protocol is on the access control function, and therefore the NAS connection management service can also be implemented by the access control function.

(6) Registration management service.

(7) Security-related services. In some embodiments, the security-related services may include at least one of the following: an access authentication service; an access authorization service; a security anchor functionality service, and a network slice-specific authentication and authorization service.

(8) Non-3GPP access support services.

In some embodiments, the mobility management service provided by the mobility management function may include at least one of the following (1) to (9).

(1) Reachability management service.

(2) Mobility management service.

(3) UE mobility event notification service.

(4) Lawful interception of services.

(5) Session Management (SM) support service. For example, transmission of SM messages between the terminal and the SMF is provided; transparent proxy for routing SM messages is performed, and Evolved Packet Switched System (EPS) bearer ID allocation for interworking with EPS is performed.

(6) SMS support function. For example, transmission of SMS messages between a terminal and a Short Message Service Function (SMSF) is provided (provide transport for SMS messages between UE and SMSF).

(7) Location service support function. For example, location services management for regulatory services is performed; and a transmission service of location service messages between the terminal and the LMF and between the Radio Access Network (RAN) and the LMF is provided.

(8) Cellular Internet Of Things (CIOT) service support function, for example, support for control plane CIOT optimization; and support for user plane CIOT optimization (9) External parameter configuration function, for example, provisioning of external parameters, such as expected UE behavior parameters or network configuration parameters.

For example, the access control function mentioned in the foregoing embodiments may also be configured to receive an uplink NAS message, and locally process the uplink NAS message or send the third target information in the uplink NAS message to a third target network function. For example, the access control function sends necessary information in the decrypted uplink NAS message to the mobility management function through a service interface. The third target network function mentioned in this example may be a network function, such as a mobility management function other than the access control function in the core network system.

In this embodiment, all NAS messages on the N1 interface can be directly sent to the access control function by the access network device (such as a base station). After the access control function performs decryption processing, the NAS messages are processed locally or forwarded to the third target network function for processing.

For example, the access control function mentioned in the foregoing embodiments may also be configured to send a downlink NAS message to the terminal, and the downlink NAS message may be locally generated by the access control function.

In some embodiments, the fourth target network function or the mobility management function mentioned in the foregoing embodiments may also be configured to send fourth target information to the access control function, and the access control function is also configured to send a downlink NAS message including the fourth target information to the terminal. For example, the mobility management function sends, to the access control function through the service interface, information that needs to be sent to the terminal in plain text, and the access control function ciphers the information and forwards a ciphered downlink NAS message to the terminal. The fourth target network function mentioned in this example may be a network function, such as a location service function other than the access control function in the core network system.

In the above embodiments, the access control function can be used as a termination point of a NAS protocol, and the access control function can be responsible for the ciphering and integrity protection of NAS messages. Therefore, an important function of an interface between the access control function and the mobility management function is: after the access control function decrypts an uplink NAS message, the access control function forwards necessary information to the mobility management function; the mobility management function can send, to the access control function, a message that needs to be sent to the terminal, and the access control function ciphers the information and forwards the cyphered information to the terminal through a base station. The interaction process between the access control function and the mobility management function can be implemented based on a service interface.

The core network system provided by the embodiments of the present application separates the access control function from the mobility management function by setting the access control function and the mobility management function, so that the SBA core network and the SBA-based management plane can be better integrated and the integration of an SBA access network and an SBA core network can be ensured.

The "better integration of the SBA core network and the SBA-based management plane" will be described below. In this embodiment, the control plane SBA of the access control function can retain a modular design principle of a traditional core network (such as a 4G core network). Various sub-network functions that the access control function can implement are not free combinations of microservices and instead are a set of specific sub-network functions standardized through the protocol. These sub-network functions are network functions related to access control, registration, and authentication and authorization. The management plane SBA of the mobility management function involves a purer SBA, and the mobility management function can realize various network internal services (that is, sub-network functions). During network configuration, various network internal services (that is, sub-network functions) can be combined freely and flexibly. In the embodiments of the present application, the access control function and the mobility management function are separately provided instead of being implemented by one network function (for example, both are implemented by the AMF), so that the SBA core network and the SBA-based management plane can be better integrated.

For example, in the core network system mentioned in each of the foregoing embodiments, the terminal and the core network function directly exchange information through the SBA interface, the NAS message transmitted through the SBA interface includes indication information, and the indication information is used to indicate a core network function communicating with the terminal. In this way, different core network functions can be distinguished through the indication information.

In an example, the first byte of the NAS message is used to transmit an extended protocol discriminator information Element (IE). Referring to Table 1, the extended protocol discriminator information element uses different values to represent and distinguish communication messages between the terminal and different core network functions. For example: for uplink and downlink communication messages between the terminal and the mobility management function, the value of the extended protocol discriminator can be set to 1; for uplink and downlink communication messages between the terminal and the session management function, the value of the extended protocol discriminator can be set to 2; for uplink and downlink communication messages between the terminal and the SMS function, the value of the extended protocol discriminator can be set to 3; for uplink and downlink communication messages between the terminal and the Network Exposure Function (NEF), the value of the extended protocol discriminator can be set to 4; for uplink and downlink communication messages between the terminal and the location service function, the value of the extended protocol discriminator can be set to 5; and for uplink and downlink communication messages between the terminal and the subscription management function, the value of the extended protocol discriminator can be set to 6.

TABLE 1

| | Extended protocol discriminator format | | | | |
| --- | --- | --- | --- | --- | --- |
| IEI | Information Element | Type (Type/ Reference) | Mandatory or not (Presence) | Format | Length |
| | Extended protocol discriminator | Extended protocol discriminator x.x | Mandatory (M) | V | 1 |

For example, the SBA interface mentioned in each of the foregoing embodiments satisfies one of the following: implementation based on a Restful interface; implementation based on a Restful enhanced interface, and implementation based on a target SBA service interface protocol.

In this embodiment, the SBA interface provided by the terminal and multiple core network functions can be implemented based on the Restful interface, and the Restful interface can be implemented based on Hypertext Transfer Protocol (HTTP) 2.0; or the Restful interface can be based on the HTTP3.0 Restful enhanced interface, or the SBA interface can be implemented based on other SBA service interface protocols, for example, based on the Packet Forwarding Control Protocol (PFCP).

For example, the core network system provided by various embodiments of the present application may provide, for terminals, services including at least one of the following (1) to (11).

(1) an initial registration service for the terminal;

(2) an authentication and authorization service for the terminal;

(3) a security establishment service for the terminal;

(4) a mobility management service for the terminal;

(5) a session establishment service for the terminal;

(6) a session modification and release service for the terminal;

(7) a security update service for the terminal;

(8) a short message service for the terminal;

(9) a location service for the terminal;

(10) a subscription-related configuration parameter update service; and

(11) a statistical information request service for the terminal.

To describe in detail the core network system provided by the embodiments of the present application and the functions of the core network function in the core network system, the following description will be made in conjunction with several embodiments.

Figure 2:
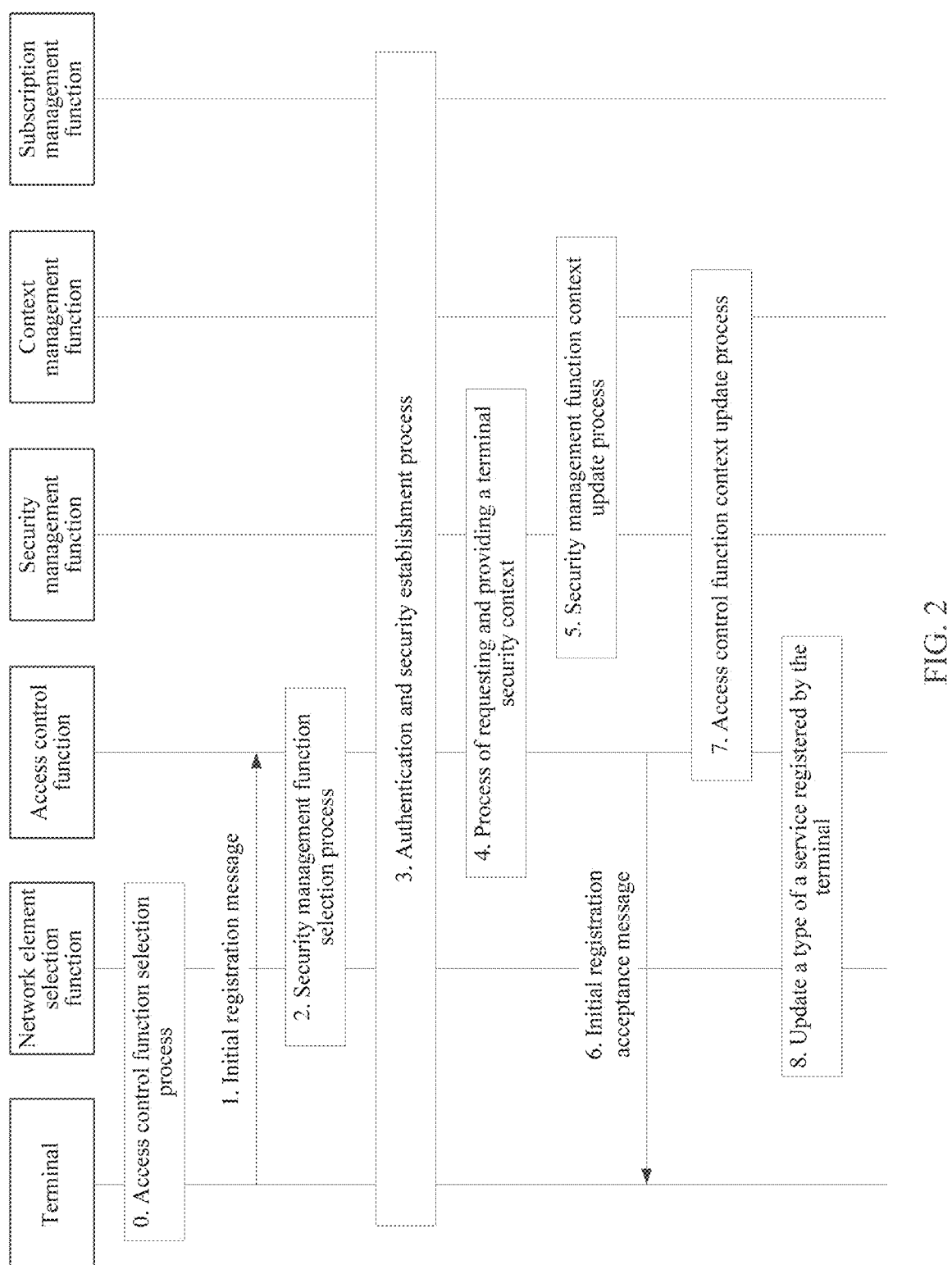
FIG. 2 is a schematic flowchart of a service that a core network system can provide for a terminal according to an embodiment of the present application.

Embodiment 1: Initial Registration and Security Establishment Process of the Terminal The embodiment shown in FIG. 2 provides the initial registration process and the security establishment process of the terminal. This embodiment omits some steps, such as the terminal identification process, the old context request process, and the policy establishment and request process, and only a process related to initial registration and security establishment is introduced. As shown in FIG. 2, this embodiment includes the following steps.

Step 0: Perform an access control function selection process between a terminal and a network element selection function.

Step 1: The terminal sends an initial registration message to the access control function.

Step 2: Perform a security management function selection process between the network element selection function and the access control function.

Step 3: Perform an authentication and security establishment process between the terminal, the security management function, and the subscription management function.

Step 4: Perform a process of requesting and providing a terminal security context between the access control function and the security management function.

Step 5: Perform a security management function context update process between the security management function and the context management function.

Step 6: The access control function sends an initial registration acceptance message to the terminal.

Step 7: Perform an access control function context update process between the access control function and the context management function.

Step 8. The network element selection function and the access control function update a registered service type, such as a session management service, a short message service, a control plane data service, and a location service. Then, the terminal can request to select the core network function of the registered service type. The location update service is a default registration service. In some embodiments, the session management service can also be used as a default registered service.

Embodiment 2: Mobility Registration Update Process of the Terminal

This mobility registration update function may also be referred to as a mobility management process. This embodiment will be introduced in two sub-embodiments.

Figure 3:
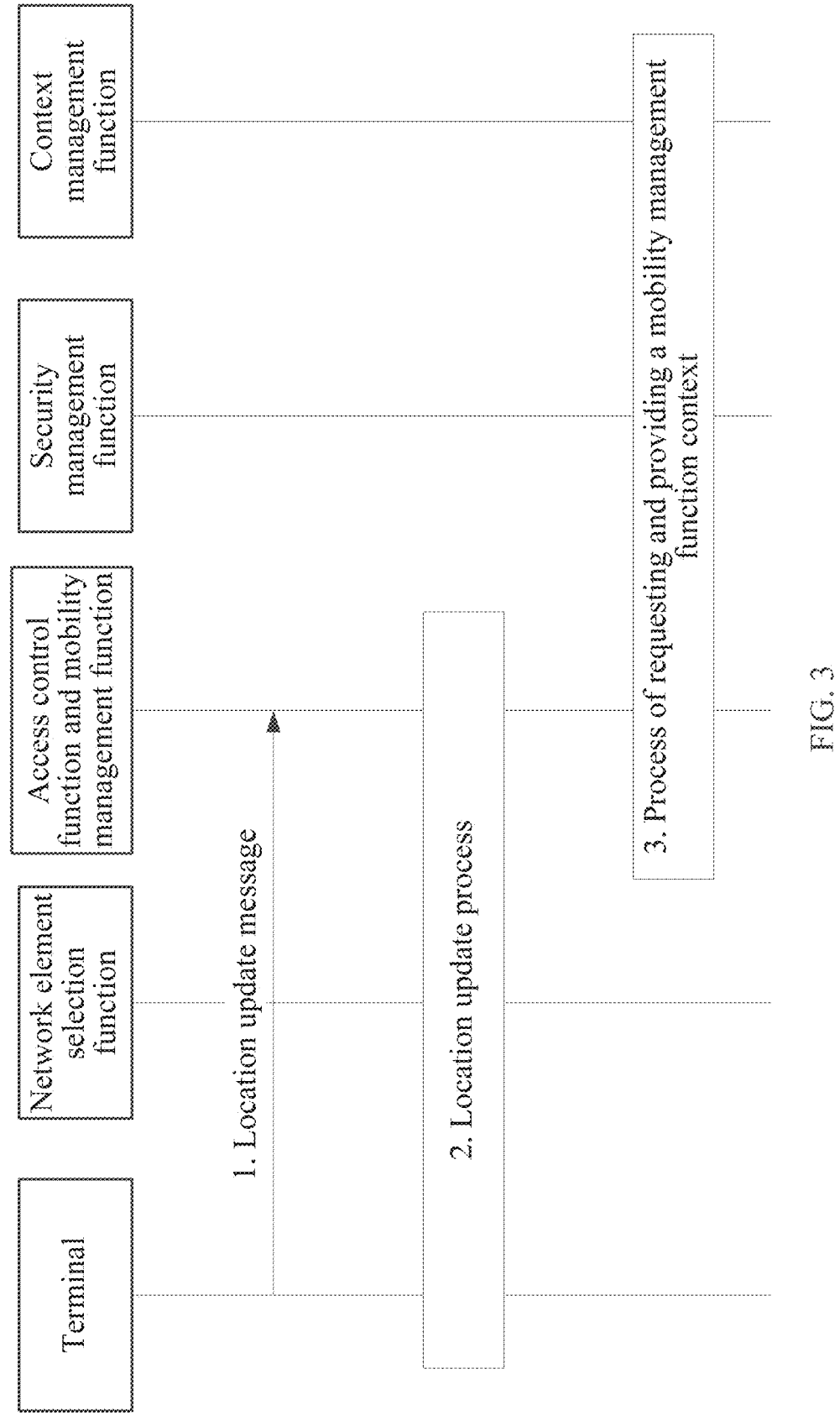
FIG. 3 is a schematic flowchart of a service that a core network system can provide for a terminal according to an embodiment of the present application.

Sub-embodiment 1: the mobility management function and the access control function are integrally provided. As shown in FIG. 3, this embodiment includes the following steps.

Step 1: The terminal sends a location update message to the access control function and the mobility management function.

Step 2: Perform a location update process of the terminal between the terminal, the access control function, and the mobility management function.

Step 3: Perform a process of requesting and providing a mobility management function context between the mobility management function and the context management function.

Figure 4:
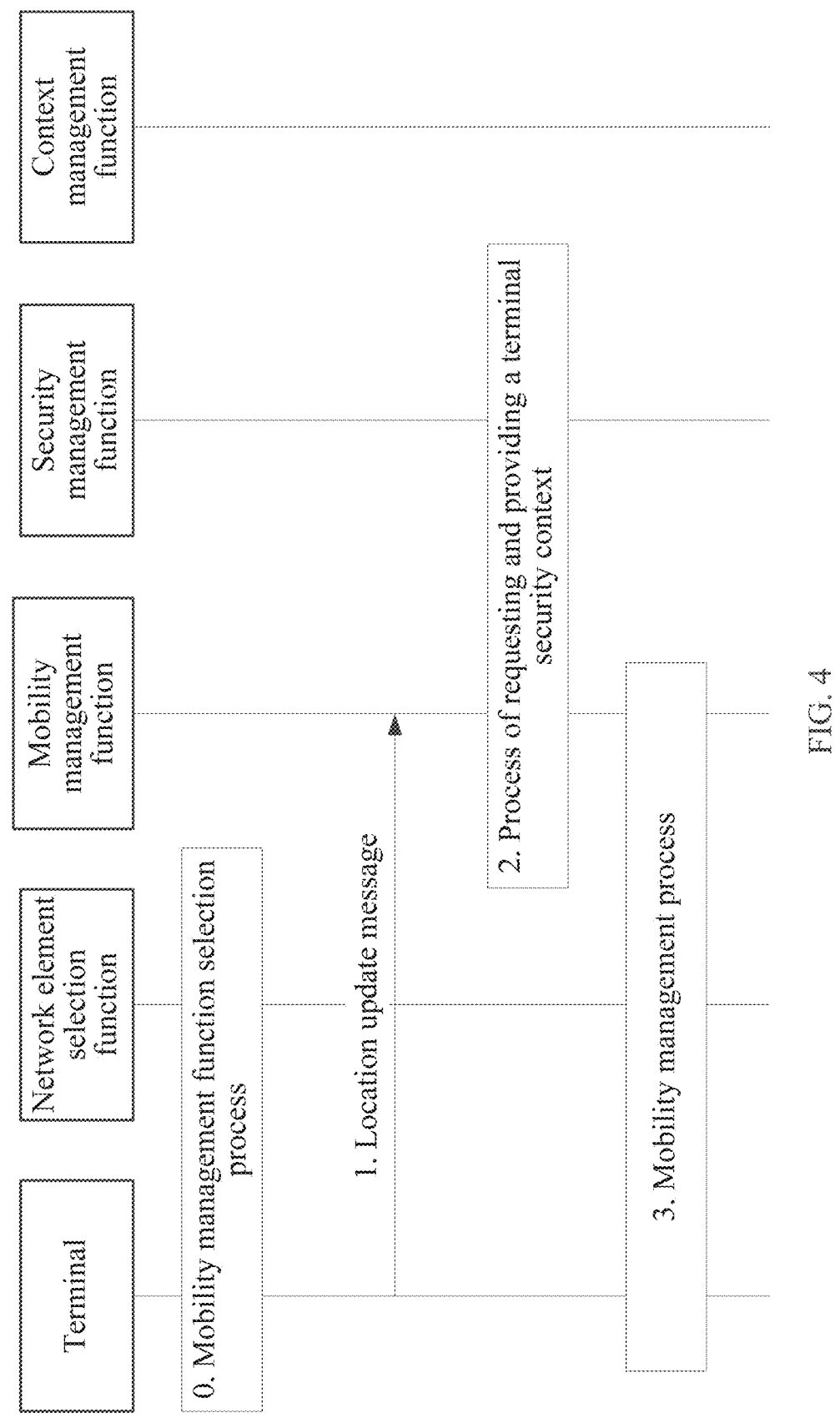
FIG. 4 is a schematic flowchart of a service that a core network system can provide for a terminal according to an embodiment of the present application.

Sub-embodiment 2: the mobility management function and the access control function are separately provided. As shown in FIG. 4, this embodiment includes the following steps.

Step 0: Perform a mobility management function selection process between the terminal and the network element selection function.

Step 1: The terminal sends a location update message to the mobility management function.

Step 2. Perform a process of requesting and providing a terminal security context between the mobility management function and the security management function.

Step 3: Perform a mobility registration update process of the terminal between the terminal and the mobility management function.

In some embodiments, after step 3, the following step may be further included: the mobility management function updates, to the context management function, a terminal context generated or updated in this process.

Embodiment 3: The Session Establishment Process of the Terminal

Figure 5:
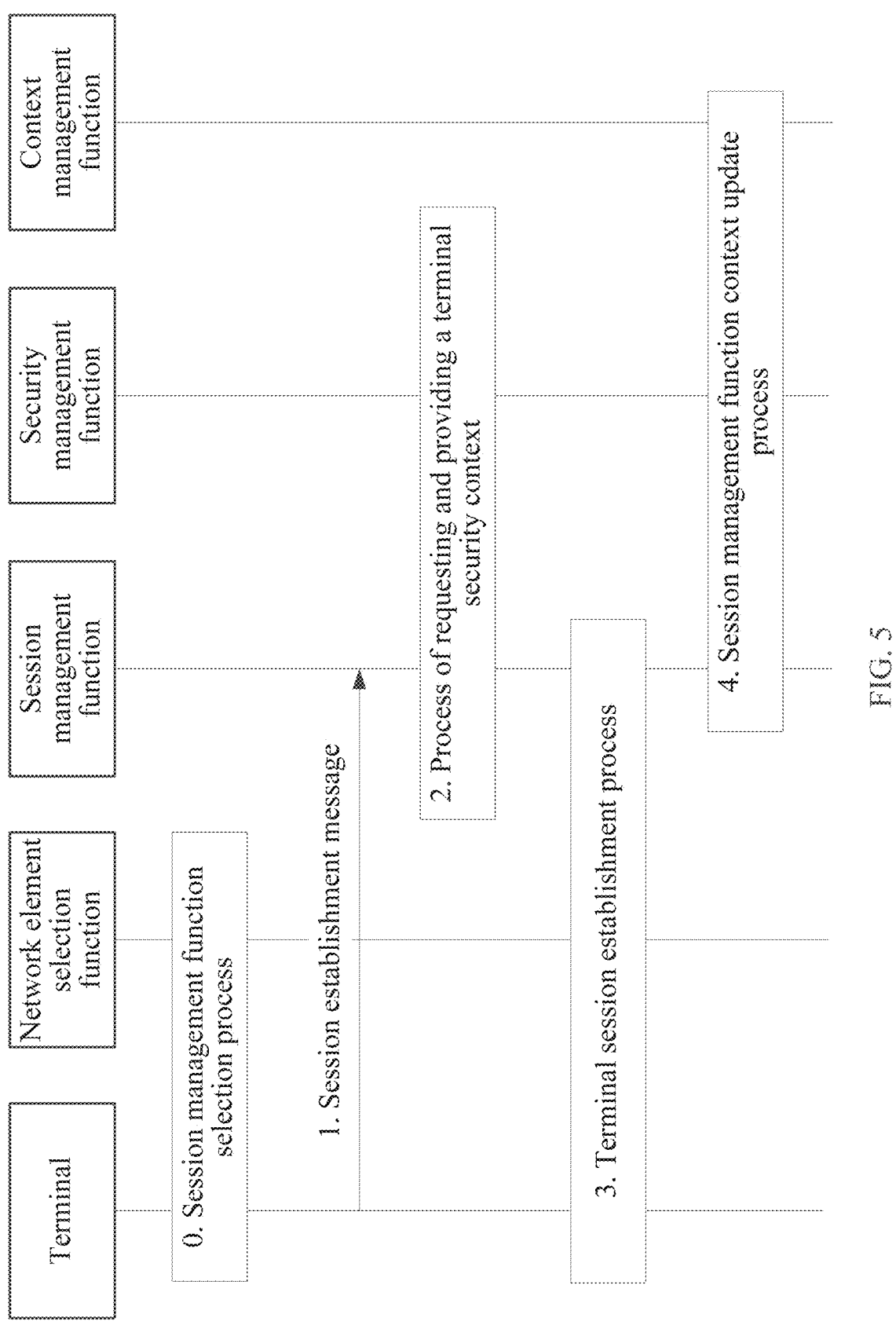
FIG. 5 is a schematic flowchart of a service that a core network system can provide for a terminal according to an embodiment of the present application.

FIG. 5 shows the session establishment process of the terminal. In this embodiment, some steps are omitted, such as a gateway selection process and a policy establishment and request process, and only the process related to session establishment is introduced. As shown in FIG. 5, this embodiment includes the following steps.

Step 0: Perform a session management function selection process between the terminal and the network element selection function.

In this embodiment, when the network element selection function selects a session management function for the terminal, the network element selection function can request a required terminal context from the context management function, for example: an established Protocol Data Unit (PDU) session context, which includes a session management function of a PDU session service that has been established for the terminal.

Step 1: The terminal sends a session establishment message to the session management function.

Step 2: Perform a process of requesting and providing a terminal security context between the session management function and the security management function.

Step 3: Perform a terminal session establishment process between the terminal and the session management function.

Step 4: Perform a session management function context update process between the session management function and the context management function.

Embodiment 4: Session Modification and Release Process of the Terminal

Figure 6:
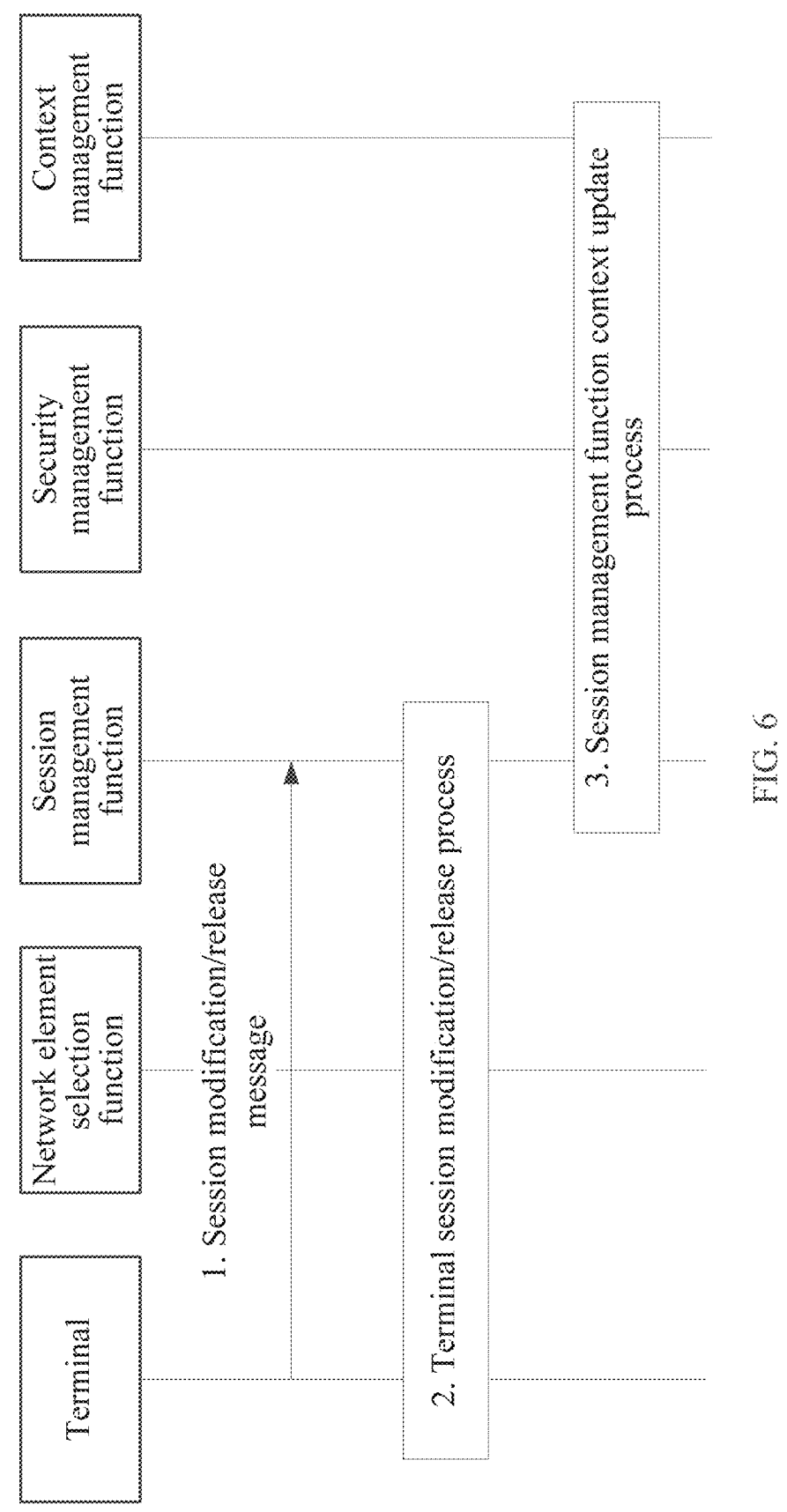
FIG. 6 is a schematic flowchart of a service that a core network system can provide for a terminal according to an embodiment of the present application.

The embodiment shown in FIG. 6 provides the session modification and release process of the terminal. This embodiment omits some steps, such as the gateway selection process and the policy establishment and request process, and only the process related to the session modification and release of the terminal is introduced.

In addition, this embodiment is usually implemented after Embodiment 3, that is, the session modification and release process is performed only after the terminal selects the session management function and establishes a session. As shown in FIG. 6, this embodiment includes the following steps.

Step 1: The terminal sends a session modification/release message to the session management function.

Step 2. Perform a terminal session modification/release process between the terminal and the session management function.

Step 3: Perform a session management function context update process between the session management function and the context management function.

Figure 7:
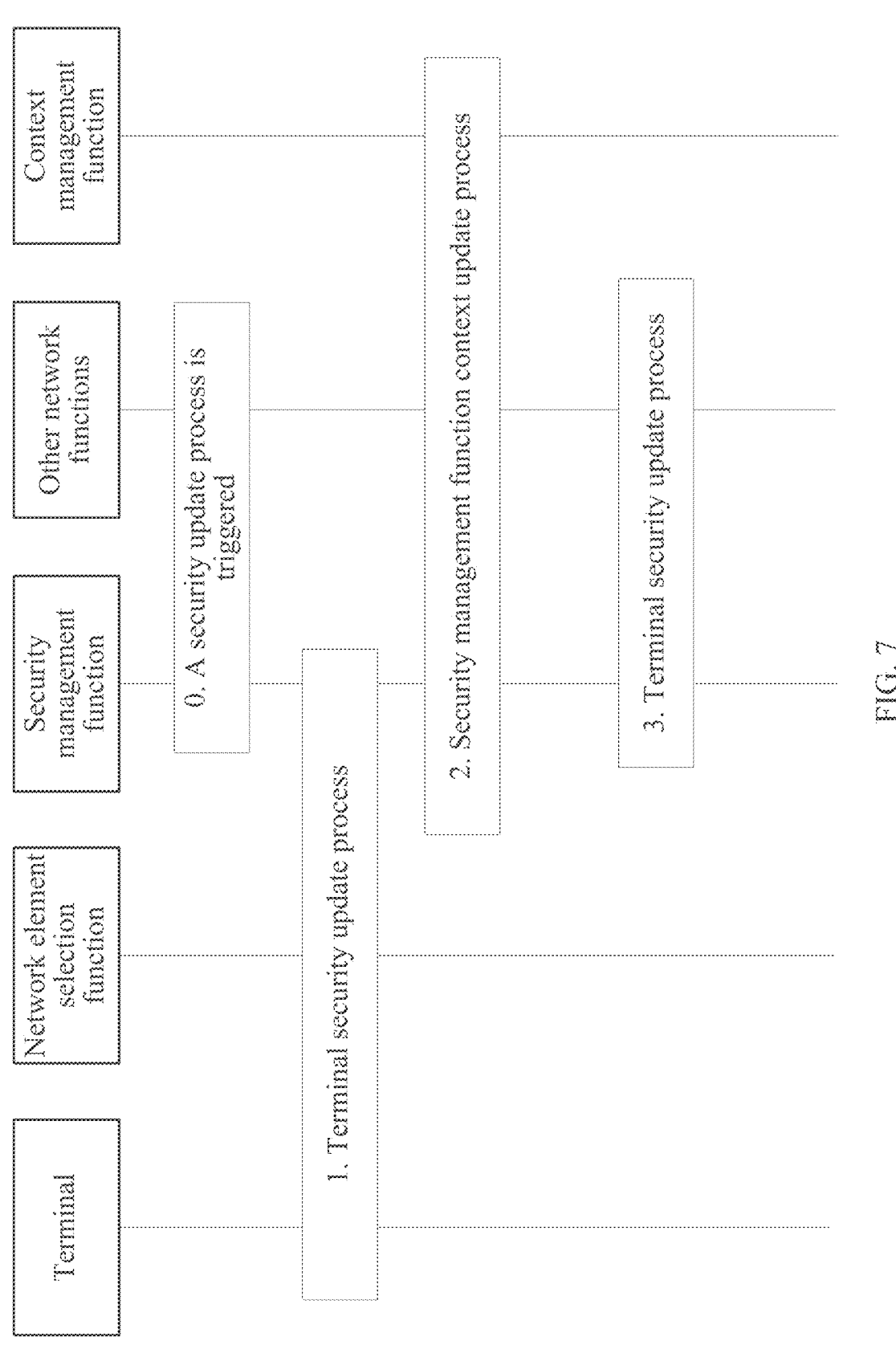
FIG. 7 is a schematic flowchart of a service that a core network system can provide for a terminal according to an embodiment of the present application.

Embodiment 5: The Security Update Process of the Terminal. As Shown in FIG. 7, this Embodiment Includes the Following Steps Step 0: Perform security update process triggering between other network functions and the security management function.

In this embodiment, a triggering condition may be a local triggering or triggering by other network functions, such as subscription change triggering and mobile triggering.

Step 1: Perform a terminal security update process between the terminal and the security management function.

Step 2: Perform a security management function context update process between the security management function and the context management function.

Step 3. Perform a terminal security update process between the security management function and other network functions. For example, a terminal security algorithm is updated to the core network function that has requested terminal security.

Figure 8:
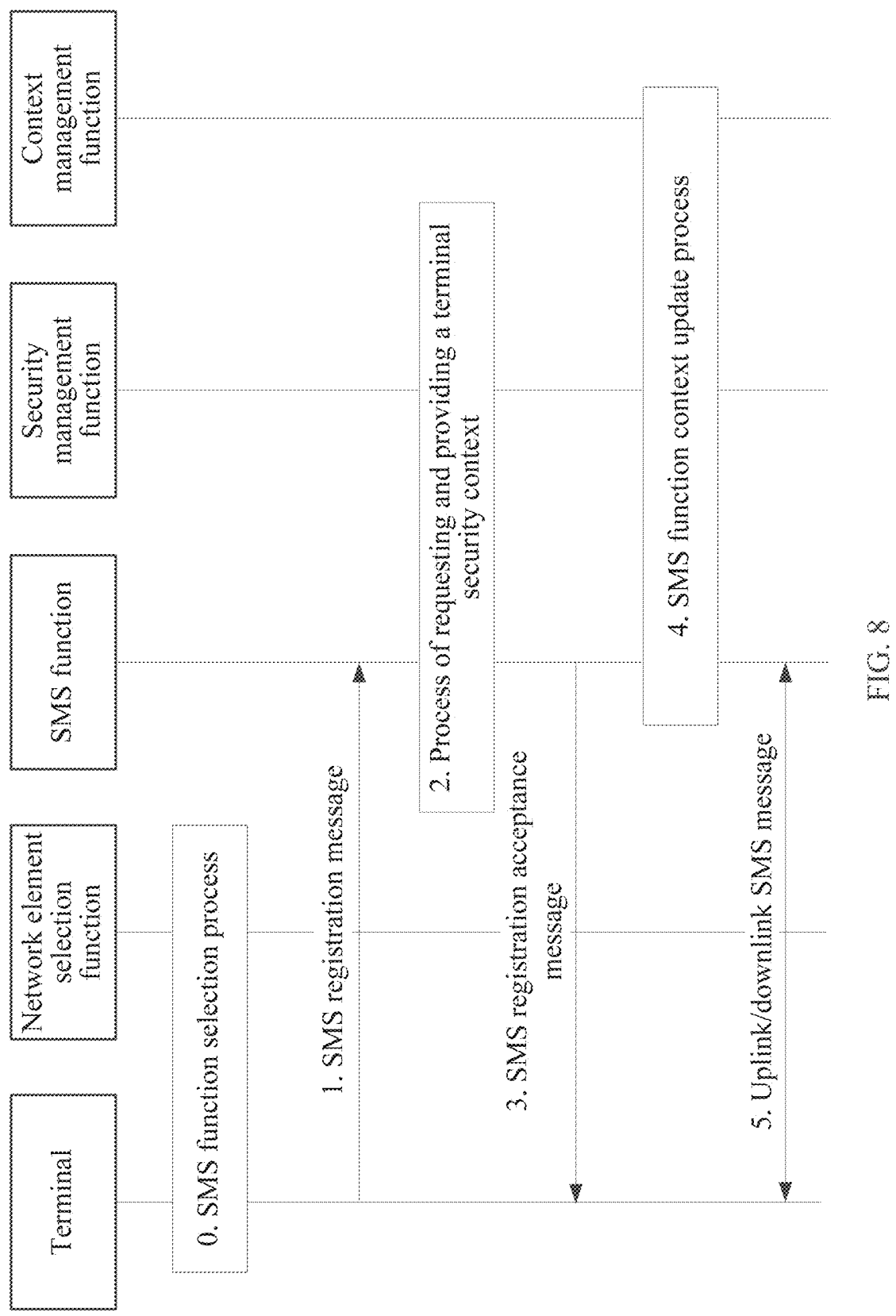
FIG. 8 is a schematic flowchart of a service that a core network system can provide for a terminal according to an embodiment of the present application.

Embodiment 6: Short Message Service Process of the Terminal. As Shown in FIG. 8, this Embodiment Includes the Following Steps Step 0. Perform an SMS function selection process between the terminal and the network element selection function.

Step 1: The terminal sends an SMS registration message to the SMS function.

Step 2: Perform a process of requesting and providing a terminal security context between the SMS function and the security management function.

Step 3: The SMS function sends an SMS registration acceptance message to the terminal.

Step 4: Perform an SMS function context update process between the SMS function and the context management function.

Step 5: Transmit an SMS message between the terminal and the SMS function. For example, the terminal sends an uplink SMS message to the SMS function, and the SMS function sends a downlink SMS message to the terminal.

Embodiment 7: Location Service Process of the Terminal

Figure 9:
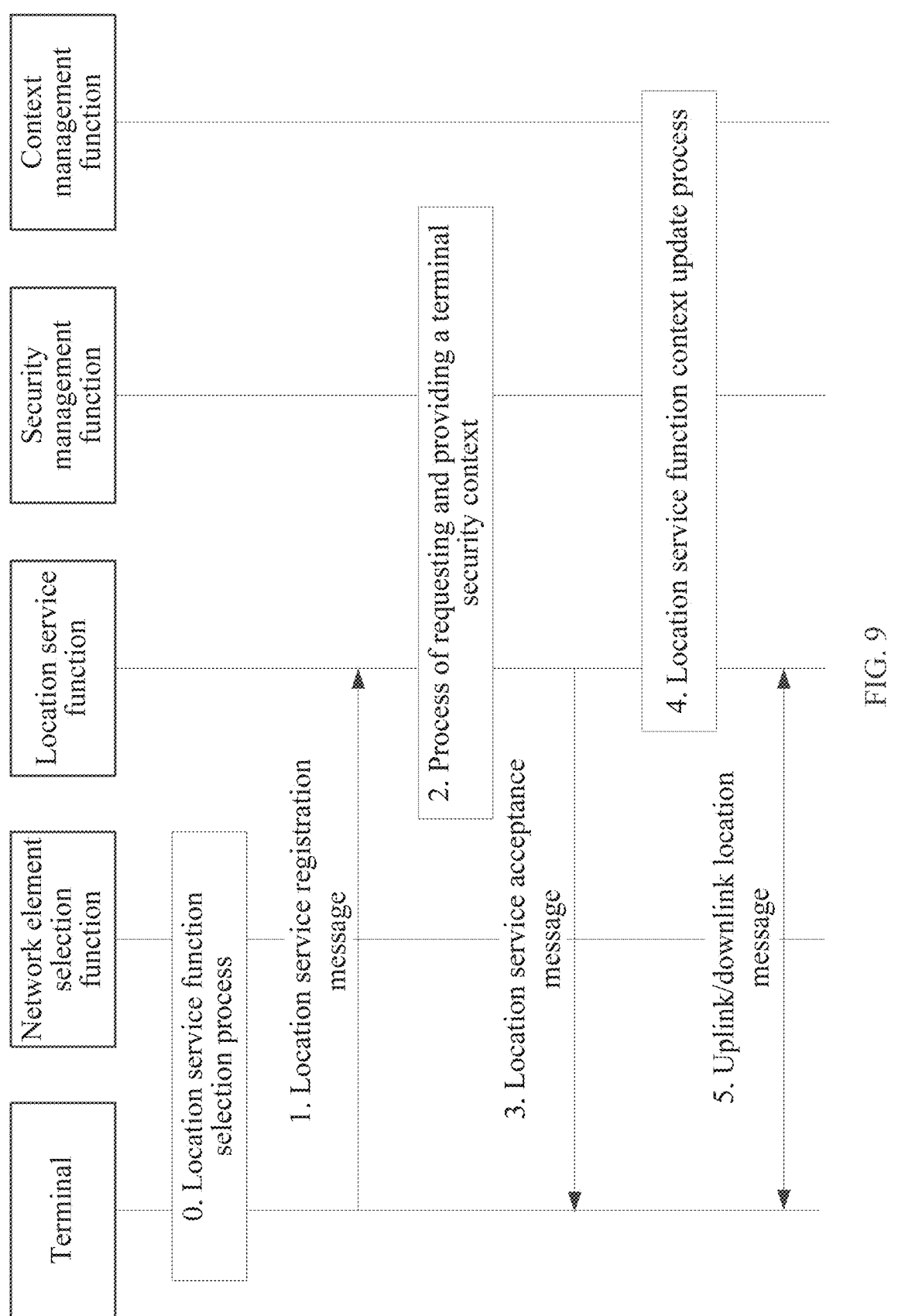
FIG. 9 is a schematic flowchart of a service that a core network system can provide for a terminal according to an embodiment of the present application.

As shown in FIG. 9, this embodiment includes the following steps.

Step 0: Perform a location service function selection process between the terminal and the network element selection function.

Step 1: The terminal sends a location service registration message to the location service function.

Step 2: Perform a process of requesting and providing a terminal security context between the location service function and the security management function.

Step 3: The location service function sends a location service acceptance message to the terminal.

Step 4: Perform a location service function context update process between the location service function and the context management function.

Step 5: Transmit a location message between the terminal and the location service function. For example, the terminal sends an uplink location message to the location service function, and the location service function sends a downlink location message to the terminal.

Embodiment 8 Subscription-Related Configuration Parameter Update Process

Figure 10:
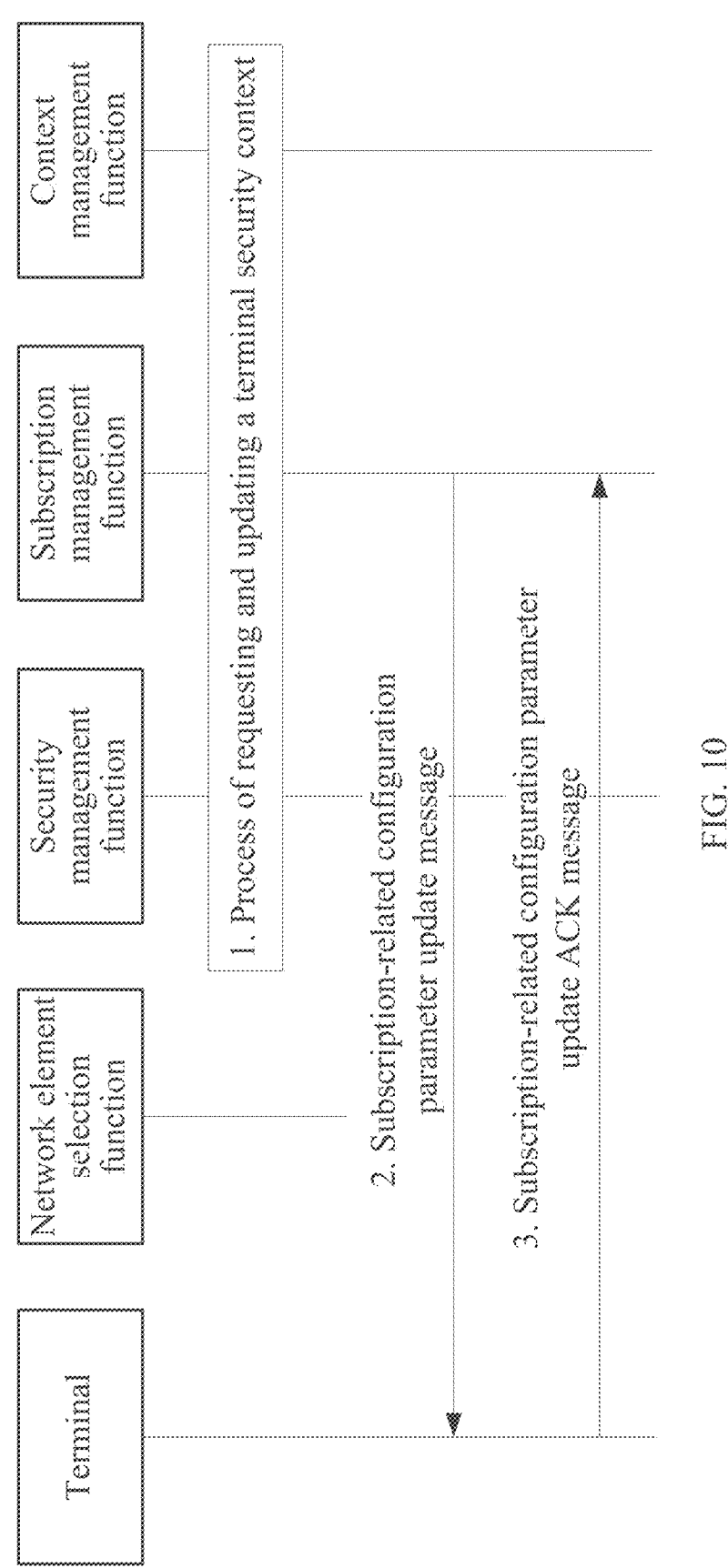
FIG. 10 is a schematic flowchart of a service that a core network system can provide for a terminal according to an embodiment of the present application.

As shown in FIG. 10, this embodiment includes the following steps.

Step 1: Perform a process of requesting and updating a terminal security context between the security management function and the subscription management function.

Step 2: The subscription management function sends a subscription-related configuration parameter update message to the terminal.

Step 3. The terminal sends a subscription-related configuration parameter update Acknowledgment (ACK) message to the subscription management function.

Embodiment 9: Terminal-Related Statistical Information Request Process

Figure 11:
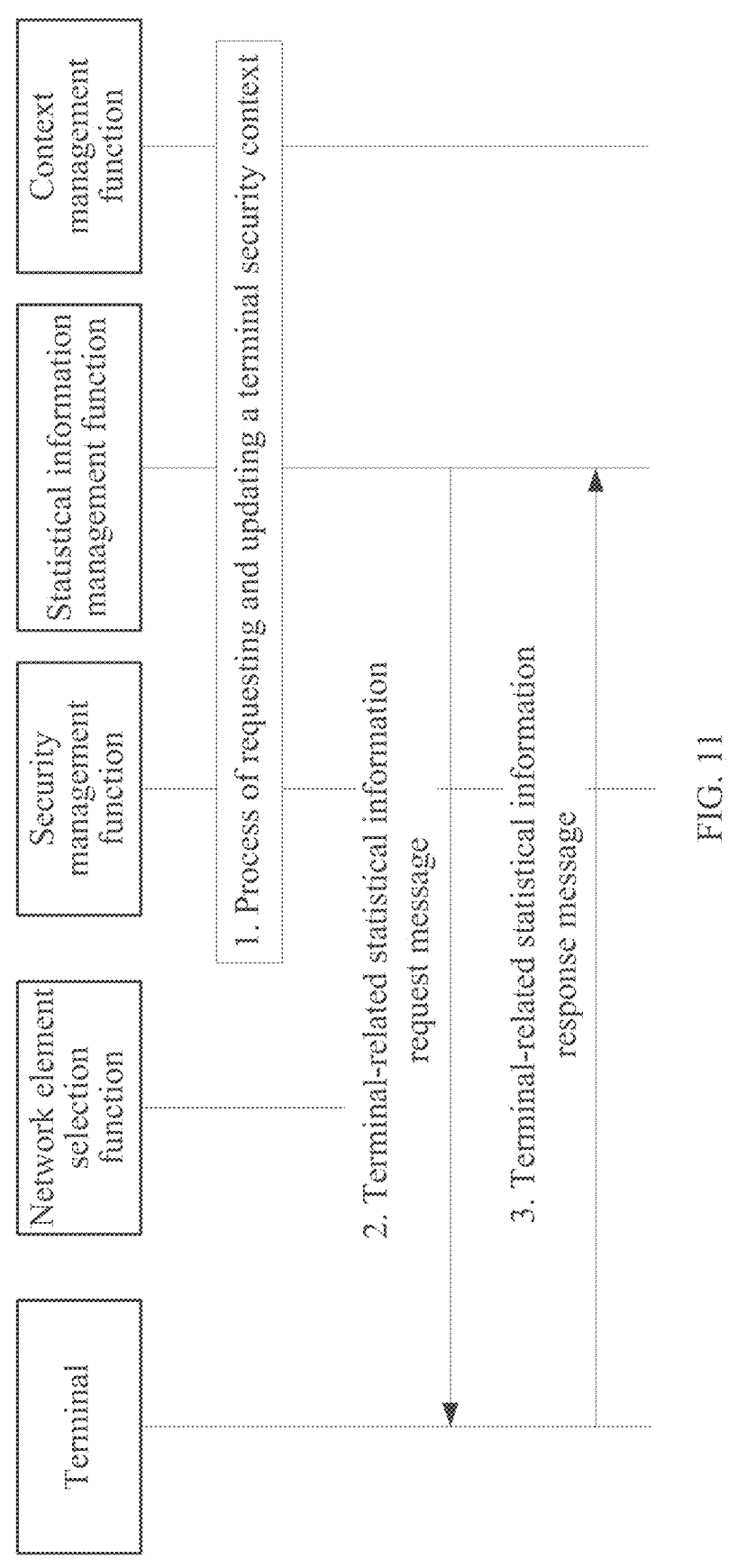
FIG. 11 is a schematic flowchart of a service that a core network system can provide for a terminal according to an embodiment of the present application.

As shown in FIG. 11, this embodiment includes the following steps.

Step 1: Perform a process of requesting and updating a terminal security context between the security management function and the statistical information management function.

Step 2: The statistical information management function sends a terminal-related statistical information request message to the terminal.

Step 3: The terminal sends a terminal-related statistical information response message to the statistical information management.

The embodiments of this application are described with reference to the accompanying drawings. However, this application is not limited to the foregoing implementations. The foregoing implementations are merely examples, but are not limiting. Under the enlightenment of this application, a person of ordinary skill in the art may make many forms without departing from the objective and the scope of the claims of this application, and these forms all fall within the protection scope of this application.

The invention claimed is:

1. A Service-Based Architecture (SBA) core network system, comprising:

a terminal;

multiple core network functions, wherein the terminal and at least one of the multiple core network functions directly exchange information through the SBA bus, wherein a Non-Access Stratum (NAS) message transmitted through the SBA bus includes indication information, and the indication information is used to indicate a core network function communicating with the terminal, wherein the core network functions comprise at least one of the following:

a Non-Access Stratum (NAS) security function, configured to provide at least one of the following services: initial authentication and secret key generation services, a security mode establishment service, a NAS message ciphering service, or a NAS message decryption service;

a context management function, configured to provide at least one of the following services: a terminal context query service or a terminal context update service;

a network element selection function, configured to provide at least one of the following services: selecting a required core network function for the terminal according to terminal requirements, or selecting, for the target network function, a core network function to be enabled; or a statistical information management function, configured to provide services comprising: statistics collection or feedback of target information.

2. The SBA core network system according to claim 1, wherein the NAS security function is configured to provide a terminal security context for a target core network function before the target core network function communicates with the terminal.

3. The SBA core network system according to claim 1, wherein the network element selection function is configured to select, for the terminal according to a type of a service requested by the terminal, a core network function capable of providing the service.

4. The SBA core network system according to claim 1, wherein the core network functions comprise at least one of the following:

an access control function, configured to provide access services and initial registration services for the terminal; or a mobility management function, configured to provide mobility management services for the terminal.

5. The SBA core network system according to claim 4, wherein:

the access control function and the mobility management function are two independent core network functions, or the access control function and the mobility management function are a same core network function.

6. The SBA core network system according to claim 1, wherein the core network functions comprise at least one of the following:

a subscription management function;

a session management function;

a location service function; or a Short Message Service (SMS) function.

7. The SBA core network system according to claim 1, wherein the SBA bus satisfies one of the following:

implementation based on a Restful interface;

implementation based on a Restful enhanced interface; or implementation based on a target SBA service interface protocol.

8. The SBA core network system according to claim 1, wherein services provided by the core network system for the terminal comprise at least one of the following:

an initial registration service for the terminal;

an authentication and authorization service for the terminal;

a security establishment service for the terminal;

a mobility management service for the terminal;

a session establishment service for the terminal;

a session modification or release service for the terminal;

a security update service for the terminal;

a short message service for the terminal;

a location service for the terminal;

a subscription-related configuration parameter update service; or a statistical information request service for the terminal.

* * * * *